United States Patent
Godin et al.

(10) Patent No.: US 12,483,908 B2
(45) Date of Patent: Nov. 25, 2025

(54) IMPROVING SERVICE CONTINUITY

(71) Applicant: Nokia Technologies Oy, Espoo (FI)

(72) Inventors: Philippe Godin, Nozay (FR);
Tsunehiko Chiba, Tokyo (JP); Laurent Thiebaut, Nozay (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 246 days.

(21) Appl. No.: 17/906,545

(22) PCT Filed: Mar. 19, 2020

(86) PCT No.: PCT/EP2020/057580
§ 371 (c)(1),
(2) Date: Sep. 16, 2022

(87) PCT Pub. No.: WO2021/185446
PCT Pub. Date: Sep. 23, 2021

(65) Prior Publication Data
US 2023/0142879 A1 May 11, 2023

(51) Int. Cl.
*H04W 24/02* (2009.01)
*H04W 36/00* (2009.01)
(Continued)

(52) U.S. Cl.
CPC ....... *H04W 24/02* (2013.01); *H04W 36/0022* (2013.01); *H04W 36/13* (2023.05); *H04W 60/04* (2013.01); *H04W 76/30* (2018.02)

(58) Field of Classification Search
CPC ..... H04W 24/02; H04W 76/30; H04W 36/13; H04W 36/0022; H04W 60/04
(Continued)

(56) References Cited

U.S. PATENT DOCUMENTS

| 2018/0324577 | A1  | 11/2018 | Faccin et al. |
| 2020/0022061 | A1* | 1/2020 | Jin ................... H04W 48/06 |
| 2021/0274407 | A1* | 9/2021 | Wu ................... H04W 36/026 |

FOREIGN PATENT DOCUMENTS

| WO | 2018135992 A1 | 7/2018 |
| WO | 2020034983 A1 | 2/2020 |

OTHER PUBLICATIONS

3GPP TSG-RAN WG3 95bis R3-171251 Spokane, Washington, USA, Apr. 3-7, 2017.*

(Continued)

*Primary Examiner* — Faisal Choudhury
(74) *Attorney, Agent, or Firm* — Carter, DeLuca & Farrell LLP

(57) ABSTRACT

Methods and apparatuses for improving service continuity are disclosed. The solution comprises storing (300) information slice remapping describing how a given net-work slice may be mapped to another network slice, receiving (302) a first message from an access node, that the node serves a terminal or has received a request to serve a terminal utilising a network slice not supported by the node and transmitting (304) based on the first message a message to a network entity responsible for session management to control the connection of the terminal, with the information on slice remapping and/or activity status of the packet data unit sessions associated with the slice not supported by the node.

17 Claims, 5 Drawing Sheets

(51) Int. Cl.
  *H04W 60/04* (2009.01)
  *H04W 76/30* (2018.01)
(58) Field of Classification Search
  USPC .......................................................... 370/329
  See application file for complete search history.

(56) References Cited

OTHER PUBLICATIONS

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"Study on enhancement of RAN Slicing", 3GPP TSG-RAN meeting #86, RP-193254, Agenda: 9.1.2, CMCC, Dec. 9-12, 2019, 4 pages.

"3rd Generation Partnership Project; Technical Specification Group Services and System Aspects; Procedures for the 5G System (5GS); Stage 2 (Release 16)", 3GPP TS 23.502, V16.3.0, Dec. 2019, pp. 1-558.

International Search Report and Written Opinion received for corresponding Patent Cooperation Treaty Application No. PCT/EP2020/057580, dated Dec. 11, 2020, 14 pages.

"Discussion on slice list for failed PDU session in Path Switch procedure", 3GPP TSG-RAN WG3 Meeting #99, R3-181212, Agenda: 10.2.1.3, LG Electronics Inc., Feb. 26-Mar. 2, 2018, 3 pages.

"Slice re-mapping or removal during mobility", 3GPP TSG-RAN WG3 #95bis, R3-171143, Agenda: 10.3, Ericsson, Apr. 3-7, 2017, 5 pages.

"Further Discussion on Slice Re-mapping", 3GPP TSG-RAN WG3 95bis, R3-171251, Agenda: 10.3, Huawei, Apr. 3-7, 2017, 7 pages.

Office action received for corresponding Indian Patent Application No. 202247058027, dated Jan. 3, 2023, 7 pages.

Office action received for corresponding Chinese Patent Application No. 202080098689.X, dated Dec. 16, 2024, 12 pages of office action and 2 pages of translation available.

"Connected mode mobility with slicing", 3GPP TSG-RAN WG3#95bis, R3-171116, Agenda: 10.3, Nokia, Apr. 3-7, 2017, pp. 1-5.

Second Office Action for Chinese Application No. 202080098689X dated May 13, 2025, 13 pages total.

* cited by examiner

IMPROVING SERVICE CONTINUITY

RELATED APPLICATION

This application was originally filed as PCT Application No. PCT/EP2020/057580, filed on Mar. 19, 2020, each of which is incorporated herein by reference in its entirety.

FIELD OF THE INVENTION

The exemplary and non-limiting embodiments of the invention relate generally to wireless communication systems. Embodiments of the invention relate especially to apparatuses and methods in wireless communication networks.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

In communication systems, and communication systems supporting multiple access nodes or base stations in particular, handover is one of the key procedures carried out for mobility while in connected. In many systems, handover procedure of a user terminal is initiated based on the measurement report received from user terminal when a reference signal received power level from a nearby node is better than the reference signal received power level from the serving node. Source node initiates handover request to target node and upon successful handover, the communication link or links are transferred to the target node.

Developing networks enable new services to customers. One suggested service is network slicing, which enables offering connectivity, quality of service and data processing solutions tailored to specific customers' requirements. A network slice is a logical end-to-end virtual network that can be dynamically created and that provides specific capabilities and characteristics. Multiple network slices may be created on top of a common shared physical network infrastructure to run services that may have different requirements on latency, reliability, throughput and mobility.

User terminals may utilise one or more slices in communication. To ensure smooth handovers and efficient mobility between the nodes slices should be taken into account.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of various claims.

According to an aspect of the present invention, there are provided methods of various claims.

According to an aspect of the present invention, there are provided computer programs comprising instructions of various claims.

One or more examples of implementations are set forth in more detail in the accompanying drawings and the description below. Other features will be apparent from the description and drawings, and from the claims. The embodiments and or examples and features, if any, described in this specification that do not fall under the scope of the independent claims are to be interpreted as examples useful for understanding various embodiments of the invention.

BRIEF DESCRIPTION OF THE DRAWINGS

Embodiments of the present invention are described below, by way of example only, with reference to the accompanying drawings, in which.

DETAILED DESCRIPTION OF THE INVENTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly, and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
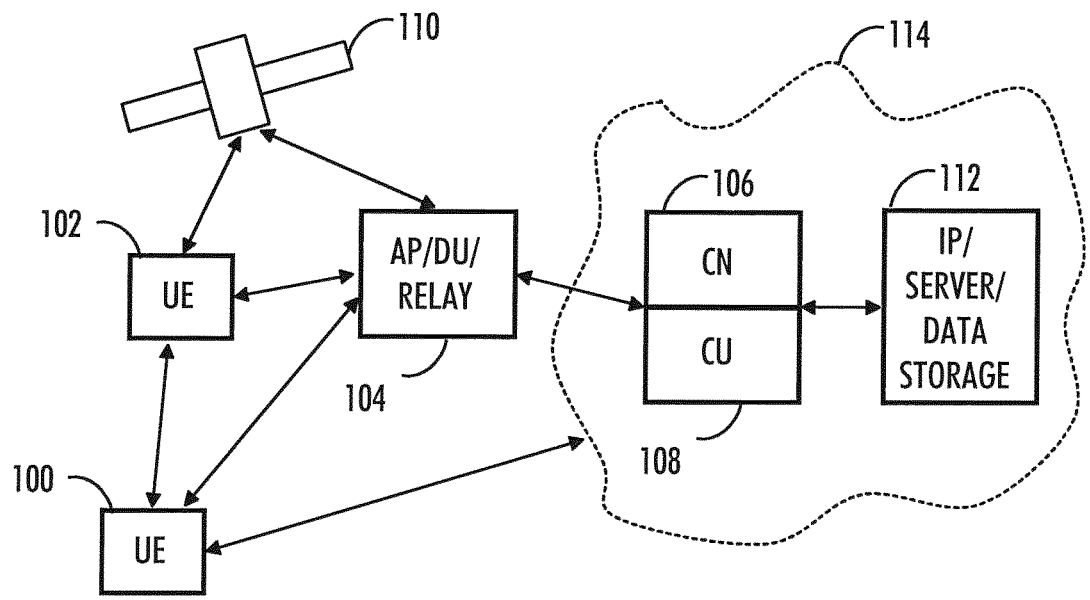
FIGS. 1 and 2 illustrate examples of simplified system architecture of a communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g) NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can comprise an Access and Mobility management Function, AMF, A Session Management Function, SMF for managing data connectivity of devices (user terminals), an User Plane Function, UPF, for providing connectivity of devices (user terminals) to data networks, etc.

The device (also called user device, a subscriber unit, user equipment (UE), user terminal, terminal device, etc.) illustrates one type of an apparatus to which resources on the air interface are allocated and assigned by the network, and thus any feature described herein with a device may be implemented with a corresponding apparatus, such as a smartphone, a wireline Residential Gateway or a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

Figure 2:
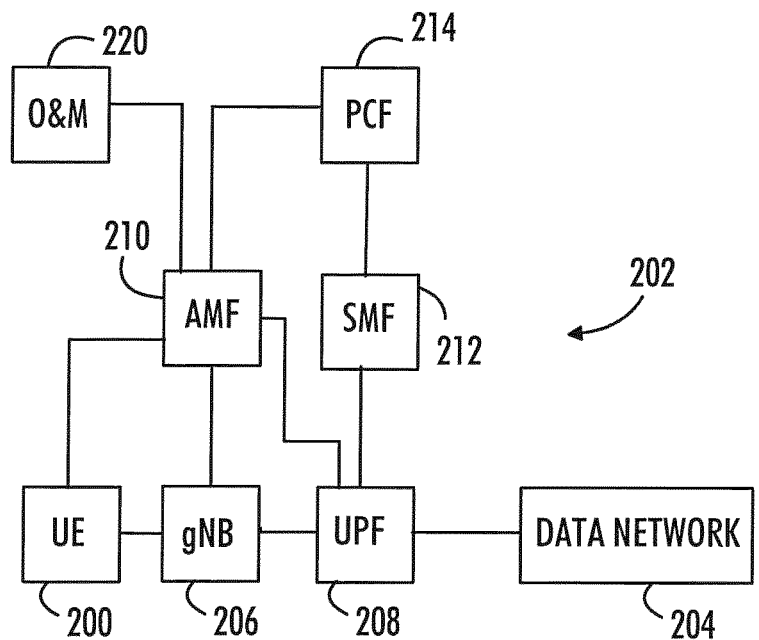

FIG. 2 illustrates an example of a communication system based on 5G network entities. A user terminal or user equipment 200 communicating via a 5G network 202 with a data network 204. The user terminal 200 is connected to a base station or gNB 206 which provides the user terminal a connection to data network 204 via one or more User Plane Functions 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release and a Policy Control Function 214 which is configured to govern network behavior by providing policy rules to control plane functions. The network further comprises operations and maintenance unit (O&M) 220 of the operator of the network.

In 5G or NR networks, a concept of session and service continuity, SSC, has been defined. Three SSC modes have been defined, SSC mode 1, SSC mode 2 and SSC mode 3. In SSC mode 1, network maintains Packet Data Unit, PDU, session throughout the session lifetime regardless of user terminal mobility. In SSC mode 2, network may break connectivity and release a PDU session before making a new one. In SSC mode 3, network does not break existing connection before making a new one, thus preserving service connectivity.

As mentioned, network slicing is a concept where network resources of an end-to-end connection between a user terminal and another end point in a public land mobile network (PLMN) or a data network 204 are sliced. Similar network slicing may be employed also in private networks. A network slice may be understood as a logical end-to-end network that can be dynamically created and/or modified. The network(s) between the end devices may all be sliced from one end device to the other end device, the slices thus forming logical pipelines within the network(s). User terminal may access a slice over a radio interface. Each pipeline/slice may serve a particular service type. Examples of different network slice/service types include: eMBB (slice suitable for the handling of 5G enhanced Mobile Broadband), URLLC (slice suitable for the handling of ultra-reliable low latency communications) and MIoT (slice suitable for the handling of massive Internet of Things), for example. Communications Service Providers (CSPs) are able to define additional network slice/service types if needed. A given user terminal may access to multiple slices over the same Access Network (over the same radio interface, for example).

Thus, network slicing enables a communications service provider to provide dedicated virtual networks over a common network infrastructure. The different virtual or logical networks may be designed to provide different networking characteristics such as different qualities of service (QoS). For example, the virtual networks may be customized to meet specific needs of various applications, services, devices, customers and/or operators.

In a system where network slicing is utilized, a single physical network or a group of networks is sliced into multiple virtual networks (slices) that can support different radio access networks (RANs) or different service types running across a single RAN. The network slicing may be used to partition a core network of a cellular communication system such as a 5G system, but it may also be implemented in the RAN such as the WLAN.

Each network slice may be optimized to provide resources and network topology for the specific service and traffic that will use the slice. Network resources may be allocated according to requirements in terms of mobility, capacity, connectivity and coverage such that particular demands of each use case will be met. Physical network components or resources may be shared across different network slices.

Slices are identified by Single-Network Slice Assistance Information, S-NSSAI. Packet Data Unit, PDU, sessions of user terminals utilising slices are associated with a single S-NSSAI. During the attach procedure of user terminal to a network, the configured NSSAI is sent from core network to the user terminal. At every registration area update the user terminal can indicate a requested NSSAI which is a list of requested S-NSSAI(s). The AMF of the network takes this into account together with subscribed NSSAI to infer an allowed NSSAI sent back to the user terminal. This allowed NSSAI represents the list of S-NSSAI(s) the user terminal is allowed to use for further requests taking place in this registration area.

The slices supported by nearby base stations or access nodes may vary. Currently, when a user terminal having a PDU session utilising a slice X running at source node makes a handover to a target node, the PDU session will be released at the target node if the target node does not support slice X. Thus, the service which utilised the PDU session needs to be re-started after the handover. The new PDU session will be mapped to another slice supported by the target node. However, the interruption entailed by the handover followed by a PDU Session establishment breaks service continuity and may cause problems regarding the service.

In an embodiment, a slice remapping is applied. Thus, a given slice X supported by a radio access node is mapped to another slice Y on neighbouring radio access node. When user terminal having a PDU session utilising slice X makes a handover to a neighbouring node not supporting the slice X, the slice X is mapped to another slice Y, at least temporarily.

In an embodiment, the proposed slice re-mapping can be interpreted as a degraded mode of the original slice. For example, a given slice X, which is an URLLC slice, may be remapped onto slice Y which is a general-purpose slice. Thus, the data service of the user terminal in question is mapped to a slice of lower quality than what used to be supported. However, the service continues without interruptions. This may apply to both Xn and N2 handovers performed by a user terminal.

In an embodiment, the proposed slice re-mapping can occur also when a slice support is ending in a node.

In an embodiment, a node may temporarily accept a user terminal PDU session of a non-supported slice while the node triggers the core network to command via an SSC mode 3 or 2 the user terminal to establish a new PDU session to a target slice and to then proceed with the removal of the PDU session of non-supported slice as part of the allowed NSSAI of the user terminal.

Figure 3:
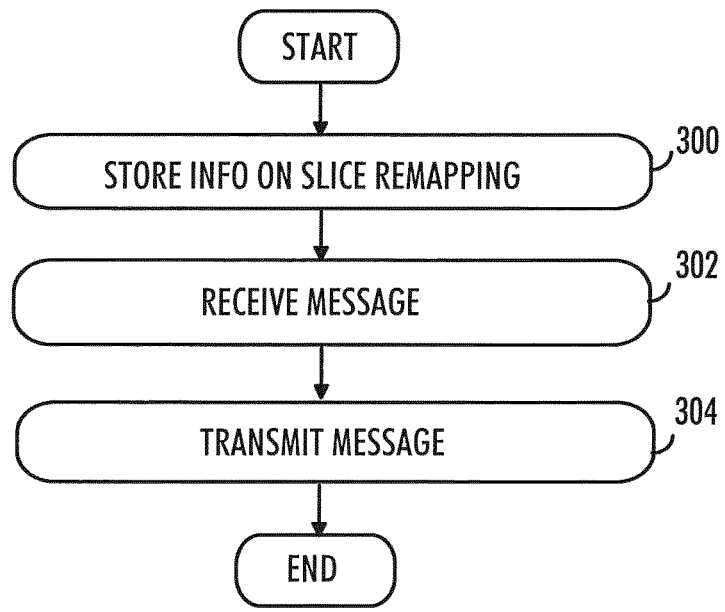
FIGS. 3, 4A, 4B and 4C are flowcharts illustrating some embodiments.

FIG. 3 is a flowchart illustrating an embodiment. The flowchart illustrates an example of the operation of the apparatus or network entity acting as the Core Access and Mobility Management Function or AMF. It may be noted here that the terms "first" and "second" are used to identify different messages without implying any particular order to the transmission of the messages.

In step 300, the apparatus is configured to store information on slice remapping describing how a given network slice may be mapped to another network slice.

In step 302, the apparatus is configured to receive a first message from a radio access node, that the radio access node serves a terminal or has received a request to serve a terminal utilising a network slice not supported by the radio access node.

In step 304, the apparatus is configured to transmit a message to a network entity responsible for session management to control connection of the terminal based on the message from the radio access node, the information on slice remapping and/or activity status of the packet data unit sessions associated with the slice not supported by the node.

Thus, in step 300, the apparatus is made aware of a slice remapping table which indicates which slice X (for example slice X of the source radio access node) can be remapped onto which slice Y (for example slice Y of the target radio access node). Several solutions exist for the configuration of this table in the apparatus.

In an embodiment, the apparatus, or AMF, has obtained the information on slice remapping from operations and maintenance unit, O&M, of the network (e.g. slice X remaps to slice Y).

In an embodiment, the apparatus, or AMF, obtains information on slice remapping from the radio access node in a second message not related to the terminal before receiving the first message where the node indicates it serves the terminal or has received a request to serve the terminal.

In an embodiment, the apparatus, or AMF, is configured to receive the information from a radio access node, such as a NG-RAN node, in a semi-static manner: during the NG-setup Request message and RAN configuration update message, the NG-RAN node may include remapping information in the message.

In an embodiment, the apparatus, or AMF, is configured to receive the information in a dynamic manner: the remapping information for the ending slice X is sent by the radio access node, such as a NG-RAN node at the same time as the information of step 302.

Whenever a radio access node detects that it is going to serve a user terminal for which support of slice X of the Allowed NSSAI is not or no longer supported, it informs the apparatus such as AMF in step 302.

There are various ways how the apparatus, or AMF, may receive step 302 information from the radio access node.

The radio access node may be configured to inform the AMF that it no longer supports a given slice X by for example one of the following mechanisms:

In an embodiment, let us assume that a radio access node is involved in an Xn handover and detects that the target radio access node does not support the slice X which is included in the Allowed NSSAI. The radio access node informs the AMF using the NG Path Switch Request (PSR) message including this information, e.g. PSR (end slice X). In case dynamic manner of indicating slice remapping applies, the PSR contains also the slice remapping table or the slice remapping option for slice X (such as slice X can be remapped to slice Y).

In an embodiment, let us assume that the radio access node is involved in an NG handover and detects that the target radio access node does not support the slice X which is included in the Allowed NSSAI. The radio access node is configured to inform the AMF using the NG Handover Notify message including the information, e.g. Handover Notify (end slice X). In case dynamic manner of indicating slice remapping applies, the Handover Notify message also contains the slice remapping table or the slice remapping option for slice X (such as slice X can be remapped to slice Y).

In an embodiment, let us assume that the radio access node is not involved in a handover, but for any reason the support of a slice X is removed. The radio access node is configured to inform the AMF that it no longer supports slice X using either existing RAN Configuration update message (end slice X) or a new NG message (end slice X). In case dynamic manner of indicating slice remapping applies, the above message contains the slice remapping table or the slice remapping option for slice X (such as slice X can be remapped to slice Y).

There are various ways for the apparatus or AMF to transmit the message of step 304 to a network entity responsible for session management, such as an SMF.

In an embodiment, consider a case where user terminal has a PDU session with active resources existing for the user terminal for a slice X and the slice X can be re-mapped to slice Y according to the remapping table. The AMF sends an update message to SMF including a new indication (end slice X, try slice Y). The SMF then triggers an SSC mode 3 procedure towards the user terminal: NAS PDU Session Modification Command (Cause, PCO (PDU Session Address Lifetime value)), where NAS indicates Non-Access Stratum and PCO indicates Protocol Configuration Option field. In this message, the SMF may add a new (end slice X, try alternate slice Y) information towards the user terminal so that the user terminal subsequently triggers the setup of PDU session 2 as part of SSC mode 3 using slice Y (instead of slice X).

In an embodiment, consider a case where user terminal has a PDU session without active resources existing for the user terminal for slice X and slice X can be re-mapped to slice Y according to remapping table: the AMF sends a delete message to SMF including a new indication (end slice X, try slice Y). SMF behaves as in the case above, or, it may alternatively trigger SSC mode 2 instead of SSC mode 3.

In an embodiment, consider a case where user terminal has a PDU session existing for the user terminal for slice X but slice X cannot be re-mapped to another slice according to the remapping table. The AMF is configured to send a delete message to SMF to trigger the release of this PDU session.

The proposed solution works also with legacy user terminals, this is user terminals not knowledge of the proposed solution. A legacy user terminal does not understand the new (end slice X, try alternate slice Y) message and may first trigger a PDU session 2 using slice X again which will be rejected. Next the user terminal may try to establish a new PDU session 2 with slice Y as per second priority of URSP (User Equipment Route Selection Policy) rules. For the legacy terminals, the procedure therefore works but is slightly inefficient.

Figure 4A:
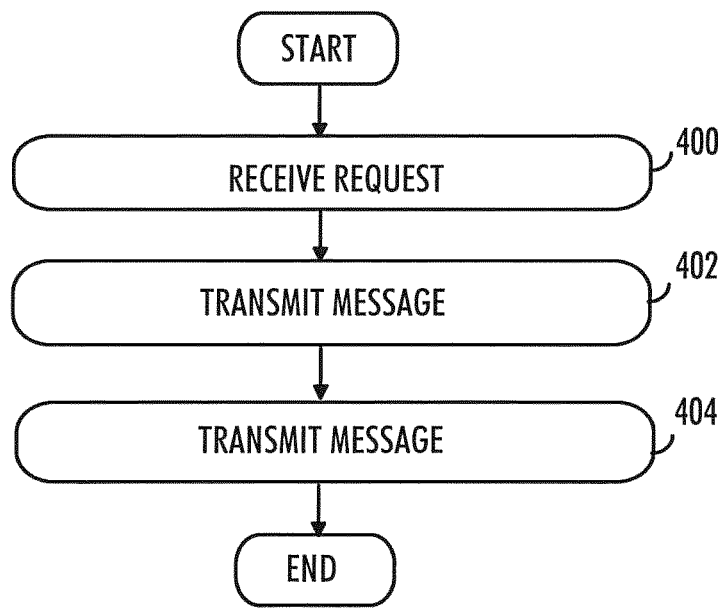

FIG. 4A is a flowchart illustrating an embodiment. The flowchart illustrates an example of the operation of the apparatus or network entity acting as radio access node which is the target node of a user terminal performing a handover from source radio access node.

In step 400, the apparatus is configured to receive a request to serve a user terminal having a session utilising a network slice not supported by the apparatus or receive a request that the network slice utilized by a session serving a terminal is no longer to be supported.

In step 402, the apparatus is configured to transmit a message to the node serving the terminal which sent the received request with information that the apparatus will temporarily accept the terminal session.

In step 404, the apparatus is configured to transmit a message to a network entity responsible for mobility management in the network regarding the terminal and remapping of the session.

Figure 4B:
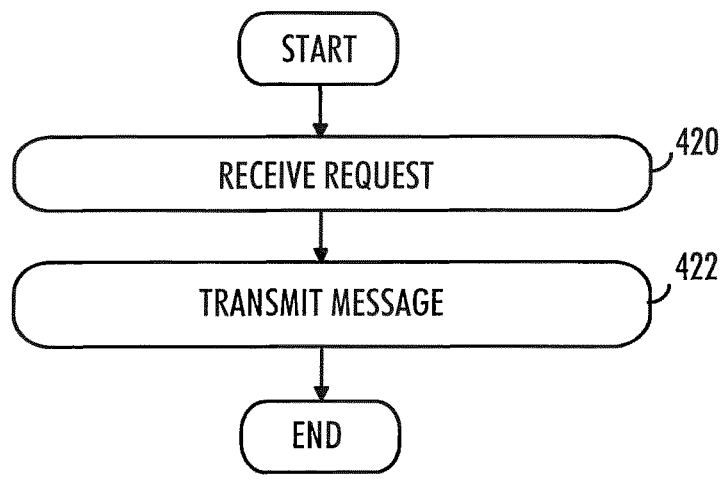

FIG. 4B is a flowchart illustrating an embodiment. The flowchart illustrates an example of the operation of the apparatus or network entity acting as the Session Management Function, SMF or a part of an SMF.

In step 420, the apparatus is configured to receive a request from a network entity responsible for mobility management in the network to update or release a packet data unit session comprising information on an associated slice to be released and a slice replacing the released slice.

In step 422, the apparatus is configured to transmit a message towards a user terminal to release the packet data unit session including the information on the associated slice to be released and a slice replacing the released slice.

In an embodiment, the message transmitted towards the user terminal is the Non-Access Stratum PDU Session Modification Command (Cause, Protocol Configuration Option (PDU Session Address Lifetime value)).

In an embodiment, the message transmitted towards the user terminal is the Non-Access Stratum PDU Session Release including the cause (re-establish to same data network).

Figure 4C:
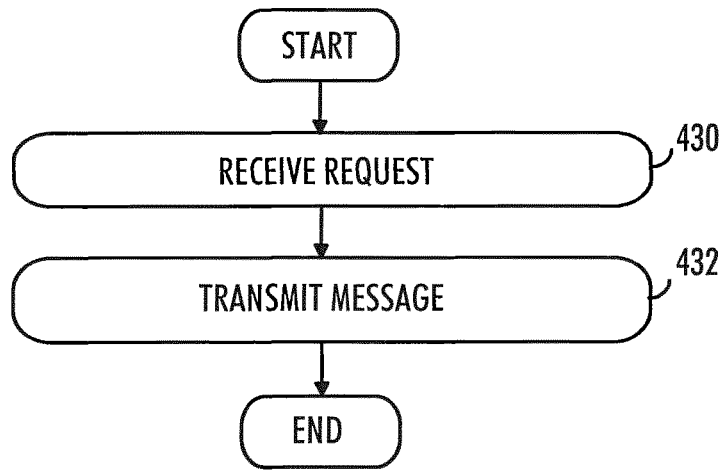

FIG. 4C is a flowchart illustrating an embodiment. The flowchart illustrates an example of the operation of a user terminal apparatus.

In step 430, the apparatus is configured to receive a request from network entity responsible for session management in the network to trigger SSC mode 3 or SSC mode 2 for a packet data unit session comprising information on an associated slice to be released and a slice replacing the released slice;

In step 432, the apparatus is configured to transmit the message to establish the new packet data unit session as part of the triggered SSC mode 3/2 process using for the packet data unit session an associated slice which is the slice previously indicated as the replacing slice, regardless of the User Equipment Route Selection Policy, URSP, contained in the apparatus.

Figure 5:
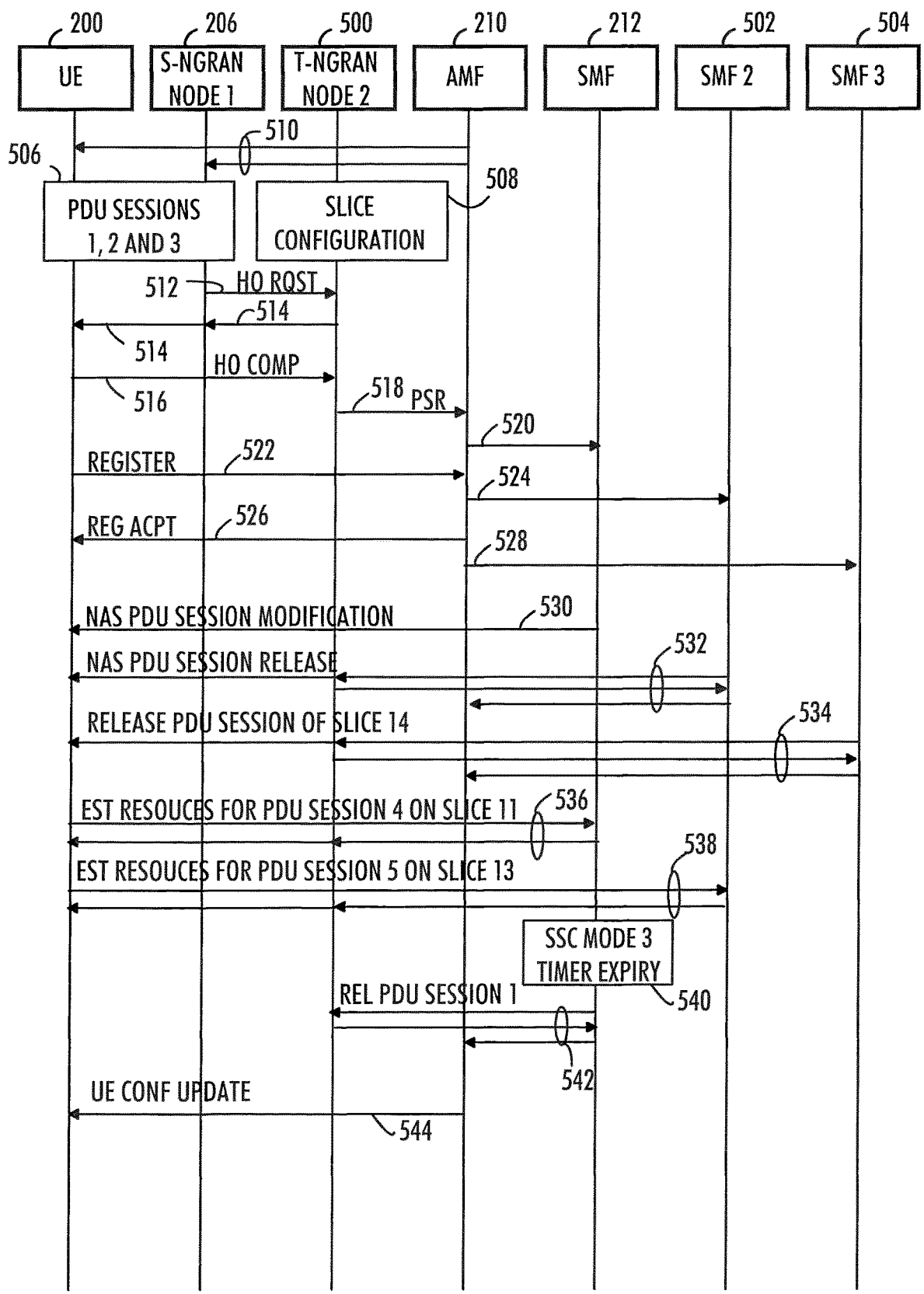
FIGS. 5 and 6 are signalling charts illustrating some embodiments.

FIG. 5 is a signalling chart illustrating an example. The chart illustrates various phases mentioned above. The chart illustrates signalling between user terminal 200, source radio access node 206, target radio access node 500, AMF 210, and three SMFs, 212, 502, 504. The user terminal 200 is about to perform an Xn handover from the source node 206 to the target node 500, where slice remapping is utilised.

The user terminal 200 has Allowed NSSAI comprising slices 10, 11, 12, 13, 14, 15.

In this example situation, the user terminal has a PDU session 1 of slice 10 active in the source radio access node 206. It is remapped into a new PDU session 4 of slice 11 because slice 10 is not supported in the target radio access node.

Further, the user terminal has a PDU session 2 of slice 12 which is not active in the source radio access node 206. It is remapped into a new PDU session 5 of slice 13 because slice 12 is not supported in the target radio access node.

Further, the user terminal 200 has PDU session 3 of slice 14 which is no longer supported in the target radio access node and is not to be remapped.

The mapping table comprises here the items:
Slice 10->11;
Slice 12->13.

The user terminal has 506 three PDU sessions 1, 2 and 3.

The O&M of the system configures the radio access nodes with the slice remapping information 508.

AMF sends 510 the UE Allowed NSSAI to the serving radio access node 206 and the user terminal 200 according to existing procedures.

The source radio access node 206 transmits a handover request 512 to the target radio access node 500.

The target radio access node may inform 514 during the HO procedure the source radio access node that it accepts the PDU session 1 of slice 10 temporarily due to slice re-mapping action with a "PDU Session temporary accepted"-Information Element.

It may be noted that the choice of the re-mapped slice selected to replace slice 10 depends on the list of slices which can be remapped from slice 10 (for example 11 and 21) and the slices supported by the user terminal according to its Allowed NSSAI. Thus, for a user terminal 1 which has slice 10, 11 but not 21 in its Allowed NSSAI then slice 11 will be selected, for another user terminal 2 which has slice 10, 21 in its Allowed NSSAI, slice 21 would be selected, for example.

The source radio access node transmits 516 handover complete message to the target radio access node.

When the handover is completed, the target radio access node 500 is configured to include indicators "end slice 10, try alternate slice 11", "end slice 12, try 13", "end slice 14" in the Path Switch Request, PSR, sent 518 to AMF.

The PDU sessions 1, 2 and 3 of the user terminal are then processed by the AMF.

AMF detects that PDU session 1 of the user terminal 200 which utilised slice 10 in the source node 206 is to be remapped to slice 11 and is active. AMF is configured to send 520 an Update message to SMF 212 indicating "end of slice 10 and try remapping to slice 11". SMF 212 then triggers step 530.

AMF further detects that PDU session 2 utilising slice 12 is to be remapped to slice 13 and is not active. AMF is configured to send 524 a delete message to SMF2 502 indicating "end of slice 12 and try remapping to slice 13". SMF2 502 then triggers step 532.

AMF further detects that PDU session 3 is of slice 14 is not to be remapped. It sends 528 a delete to SMF3 indicating end of slice 14. SMF3 then triggers step 534.

The user terminal 200 is configured to perform 522 a post-handover registration. As the source and target radio access nodes have different slice support, they cannot belong to the same registration area for the user terminal. Because AMF received the "end slice 10, 12, 14" indicators in PSR 518 message, AMF newly still includes 526 the slice, S-NSSAI, 10, 12, 14 in the Allowed NSSAI towards the user terminal. AMF considers that slice 10, 12, 14 is still temporarily possible for this user terminal until it receives from SMF(s) notification for the actual release of all PDU sessions established on slice 10, 12, 14 (or at the expiry of a guard timer). In this example this corresponds to the notification that the PDU sessions 1, 2, 3 using slice 10, 12, 14 have been released when step 542 is reached.

In reaction to step 520, the SMF 212 is configured to trigger towards the user terminal the NAS PDU Session Modification Command "Cause, PCO (PDU Session Address Lifetime value), end slice 10, try alternate slice 11" 530 to invoke SSC mode 3. It may include optional "end slice 10, try alternate slice 11" Information Element IE towards the user terminal to indicate the targeted slice 11 and a special handling in the user terminal if the user terminal supports it. This special handling is to setup the new PDU session 4 with slice 11 even if the URSP rules in the user terminal would indicate slice 10 has higher priority.

It may be noted, as background information that SSC mode 3 corresponds to the network behaviour where the network indicates to the user terminal that an existing PDU Session will be released by the network after some timer, inviting the user terminal to as soon as possible re-establish another (new) PDU Session to compensate. In an embodiment, an optional new "end slice 10, try alternate slice 11" Information Element is used to indicate the targeted slice for the new PDU Session, indicating to the user terminal that there is no point in trying to establish the PDU Session with the initial slice 10.

The user terminal triggers 538 the establishment of a new PDU session 4 using slice 11 according to SSC mode 3 procedure. This procedure is executed as in prior art (in case of non-roaming or local breakout, LBO).

In reaction to step 524, the SMF2 502 may be configured to invoke SSC mode 3 or SSC mode 2 given that the PDU session of slice 12 is not active and no data is being delivered. If the SMF2 invokes SSC mode 3, the behaviour is similar to SMF 212 as described above at step 530.

The call flow illustrated in FIG. 5 instead shows an example where the SMF2 502 triggers SSC mode 2. In this case the SMF2 502 triggers towards the user terminal the NAS PDU Session Release 532 including the cause "re-establish to same data network, DN" and including the new "end slice 12, try slice 13" element.

In both cases, upon receiving the message 532 the user terminal triggers step 538 similar to step 536.

In reaction to step 528, the SMF3 504 may immediately trigger the release 534 of the PDU session 3 since this PDU session belongs to the slice 14 which is not to be remapped. It can include an appropriate cause value to avoid user terminal re-tries.

The SMF1 is configured to trigger the release 542 of the PDU session 1 of slice 10 according to SSC mode 3 at the end of timer expiry 540. This procedure is executed as in prior art (in case of non-roaming or local breakout, LBO).

Upon notification from the various SMFs that all PDU sessions corresponding to no longer supported slices (i.e. slices 10, 12, 14) have been released, the AMF sends the UCU (UE Configuration Update) message 544 at this stage in order to update the Allowed NSSAI towards the NG-RAN and the user terminal. In this example the new resulting Allowed NSSAI will therefore be "slice 11, slice 13, slice 15".

Above FIG. 5 described an Xn handover from the source node 206 to the target node 500. An NG/N2 handover can be executed ij a similar manner with some modifications to the FIG. 5.

The handover signals 512 to 516 of FIG. 5 are replaced by an N2 HO preparation phase which can be executed as in prior art.

The PSR message 518 is replaced by Target RAN to Target AMF: Handover Notify (Handover is by this message considered as successful in Target-RAN). The Handover Notify contains new "end slice 10, try 11" indicator for the AMF.

Figure 6:
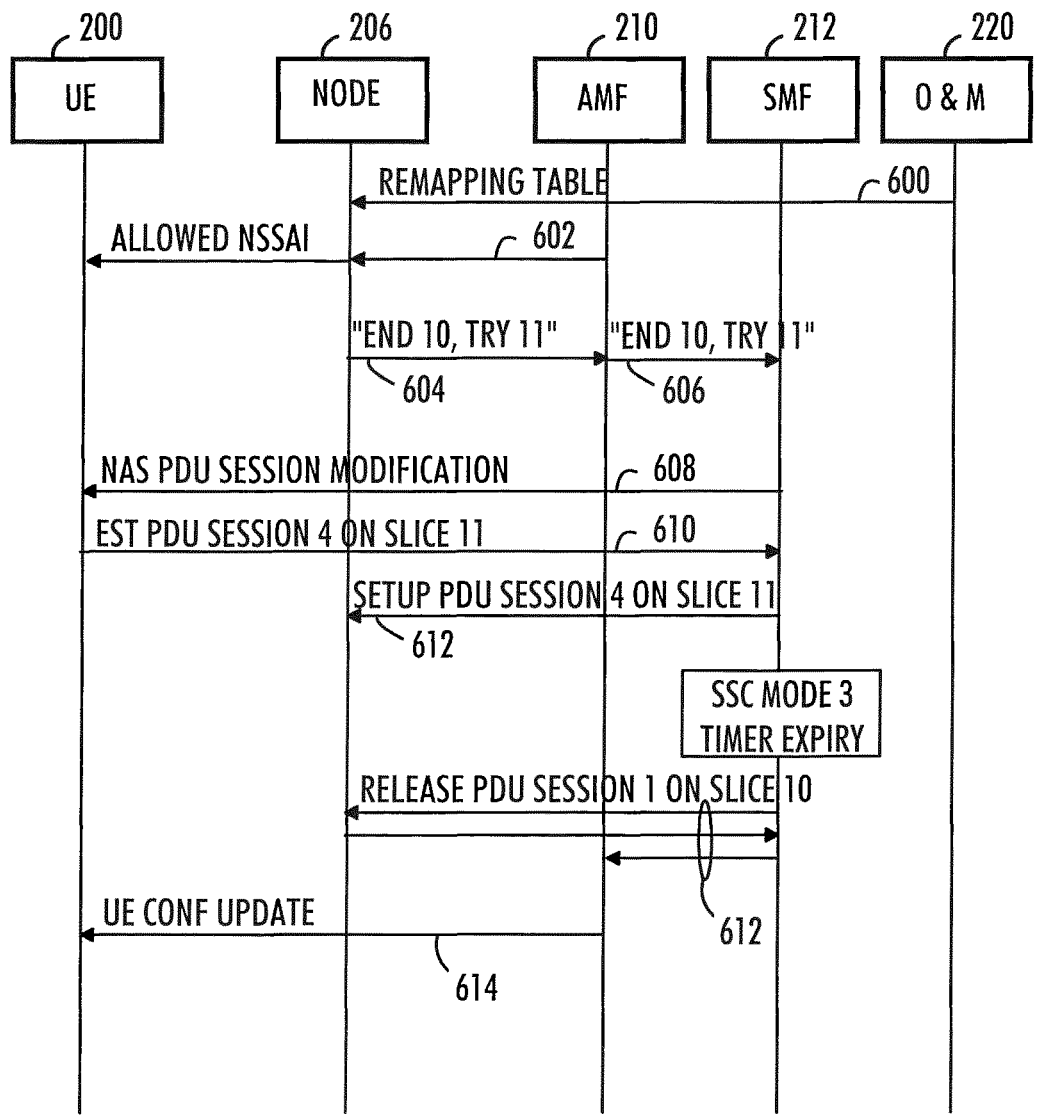

FIG. 6 is a signalling chart illustrating an example. FIG. 6 is not related to a handover, instead the example describes a case where a serving radio access node is configured to remap a given slice to another slice for corresponding PDU sessions. This may happen to overcome overload situations or to slices that are only temporarily supported in a radio access node (only during some events for example). In this example, the node is configured to remap slice 10 to slice 11.

The O&M 220 the system configures the radio access node 206 with the slice remapping information 600.

AMF sends 602 the Allowed NSSAI to the serving radio access node 206 and the user terminal 200 according to existing procedures.

The radio access node 206 transmits new indicators 604 to AMF (in existing Next Generation Application Protocol, NGAP, message or new NGAP message) notifying about the "end slice 10, try alternate slice 11". AMF transmits an update message to SMF including the new indicators "end slice 10, try alternate slice 11" in an Update message 606.

Receiving these new indicators prompts the SMF to trigger the SSC mode 3 608, 610, 612 as with FIG. 5.

The PDU sessions are cleared 612 as in FIG. 5.

The AMF 210 transmits UCU (UE Configuration Update) message 614 in order to update the Allowed NSSAI towards the NG-RAN and the user terminal.

It may be noted that in message 614 the AMF may ask the user terminal to re-register (registration steps not shown).

Figure 7:
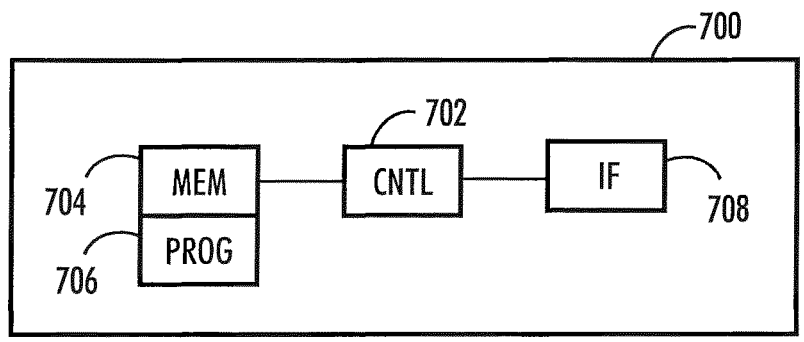
FIG. 7 illustrates an example of an apparatus.

FIG. 7 illustrates an embodiment. The figure illustrates a simplified example of an apparatus or network entity applying embodiments of the invention. In some embodiments, the apparatus may be a network entity such as AMF 210 or a radio access node 500 or a part of a network entity.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 700 of the example includes a control circuitry 702 configured to control at least part of the operation of the apparatus.

The apparatus may comprise a memory 704 for storing data. Furthermore, the memory may store software 706 executable by the control circuitry 702. The memory may be integrated in the control circuitry.

The apparatus further comprises one or more interface circuitries 708 configured to connect the apparatus to other devices and network elements or entities of the radio access network. The interface may provide a wired or wireless connection.

In an embodiment, the software 706 may comprise a computer program comprising program code means adapted to cause the control circuitry 702 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for storing information on slice remapping describing how a given network slice may be mapped to another network slice, means for receiving a first message from an access node, that the node serves a terminal or has received a request to serve a terminal utilising a network slice not supported by the node, and means for transmitting based on the first message a message to a network entity responsible for session management to control the connection of the terminal, with the information on slice remapping and/or activity status of the packet data unit sessions associated with the slice not supported by the node.

In an embodiment, an apparatus comprises means for receiving a request to serve a terminal having a session utilising a network slice not supported by the apparatus or receive a request that the network slice utilized by a session serving a terminal is no longer to be supported, means for transmitting a message to the node serving the terminal which sent the received request with information that the apparatus will temporarily accept the terminal session, and means for transmitting a message to a network entity responsible for mobility management in the network regarding the terminal and remapping of the session.

In an embodiment, an apparatus comprises means for receiving a request from a network entity responsible for mobility management in the network to update or release a packet data unit session comprising information on an associated slice to be released and a slice replacing the released slice and means for transmitting a message towards a user terminal to release the packet data unit session including the information on the associated slice to be released and a slice replacing the released slice.

In an embodiment, an apparatus comprises means for receiving a request from network entity responsible for session management in the network to trigger session and service continuity mode 3 or session and service continuity mode 2 for a packet data unit session comprising information on an associated slice to be released and a slice replacing the released slice and means for transmitting the message to establish the new packet data unit session as part of the triggered session and service continuity mode 3 or 2 process using for the packet data unit session an associated slice which is the slice previously indicated as the replacing slice, regardless of the User Equipment Route Selection Policy contained in the apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication network, comprising:
at least one processor;
and at least one memory including computer program code,
the at least one memory and the computer program code configured to, with the at least one processor, cause the apparatus at least to perform:
store information on slice remapping describing how a given network slice may be mapped to another network slice;
receive a first message from an access node, that the node serves a terminal or has received a request to serve a terminal utilising a network slice not supported by the node; and
transmit based on the first message a message to a network entity responsible for session management to control the connection of the terminal, with the information on slice remapping or activity status of the packet data unit sessions associated with the slice not supported by the node;
wherein the information on slice remapping comprises a indication that a slice X of a source radio access node is mapped to a slice Y of a target radio access node;
wherein the information on slice remapping provides a degrade mode of the slice X, and
wherein the slice Y of the target radio access node is a general-purpose slice.

2. The apparatus of claim 1, the at least one memory and the computer program code configured to, with the at least one processor, cause the apparatus further to perform at least one of the following:
control reception of information on slice remapping from operations and maintenance unit of the network; or
control reception of information on slice remapping from the access node in a second message not related to the terminal before receiving the first message where the node indicates it serves the terminal or has received a request to serve the terminal; or
control reception of information on slice remapping in the first message where the node indicates it serves a terminal or has received a request to serve the terminal.

3. The apparatus of claim 1, wherein the message from an access node is a Next Generation Path Switch Request from a radio access node or a Next Generation Handover Notify message from a radio access node.

4. The apparatus of claim 2, wherein the second message is a Next Generation Setup Request message or a Next Generation access network Configuration Update message or any new Next Generation dedicated Application Protocol message.

5. The apparatus of claim 1, wherein the message to a network entity responsible for session management comprises information on a slice to be released and on the slice replacing the released slice.

6. The apparatus of claims 1, the at least one memory and the computer program code configured to, with the at least one processor, cause the apparatus further to perform:
control reception of a registration request from the terminal after the reception of the first message,
control transmission of a registration accept to the terminal including the list of slices the terminal is allowed to use, the list still comprising at least slices not supported by the access node currently serving the terminal.

7. The apparatus of claims 1, the at least one memory and the computer program code configured to, with the at least one processor, cause the apparatus further to perform:

transmit signalling to the terminal including the list of slices the terminal is allowed to use, the list no more comprising slices not supported by the access node currently serving the terminal, when no more packet data unit sessions of the terminal use the slices no more supported by the access node currently serving the terminal or when a guard timer has expired.

8. A method in an apparatus in a communication network, comprising:

storing information on slice remapping describing how a given network slice may be mapped to another network slice;

receiving a first message from an access node, that the node serves a terminal or has received a request to serve a terminal utilising a network slice not supported by the node; and transmitting based on the first message a message to a network entity responsible for session management to control the connection of the terminal, with the information on slice remapping or activity status of the packet data unit sessions associated with the slice not supported by the node, wherein the information on slice remapping comprises a indication that a slice X of a source radio access node is mapped to a slice Y of a target radio access node;

wherein the information on slice remapping provides a degrade mode of the slice X, and wherein the slice Y of the target radio access node is a general-purpose slice.

9. The method of claim 8, further comprising at least one of the following:

controlling reception of information on slice remapping from operations and maintenance unit of the network; or controlling reception of information on slice remapping from the access node in a second message not related to the terminal before receiving the first message where the node indicates it serves the terminal or has received a request to serve the terminal; or controlling reception of information on slice remapping in the first message where the node indicates it serves a terminal or has received a request to serve the terminal.

10. The method of claim 8, wherein the message from an access node is a Next Generation Path Switch Request from a radio access node or a Next Generation Handover Notify message from a radio access node.

11. The method of claim 9, wherein the second message is a Next Generation Setup Request message or a Next Generation access network Configuration Update message or any new Next Generation dedicated Application Protocol message.

12. The method of claim 8, wherein the message to a network entity responsible for session management comprises information on a slice to be released and on the slice replacing the released slice.

13. The method of claims 8, further comprising:

controlling reception of a registration request from the terminal after the reception of the first message, controlling transmission of a registration accept to the terminal including the list of slices the terminal is allowed to use, the list still comprising at least slices not supported by the access node currently serving the terminal.

14. The method of claims 8, further comprising:

transmitting signalling to the terminal including the list of slices the terminal is allowed to use, the list no more comprising slices not supported by the access node currently serving the terminal, when no more packet data unit sessions of the terminal use the slices no more supported by the access node currently serving the terminal or when a guard timer has expired.

15. A non-transitory processor-readable medium having stored thereon a computer program comprising instructions for, with at least one processor of an apparatus, causing the apparatus to perform at least the following:

storing information on slice remapping describing how a given network slice may be mapped to another network slice;

receiving a first message from an access node, that the node serves a terminal or has received a request to serve a terminal utilising a network slice not supported by the node; and transmitting based on the first message a message to a network entity responsible for session management to control the connection of the terminal, with the information on slice remapping or activity status of the packet data unit sessions associated with the slice not supported by the node.;

wherein the information on slice remapping comprises a indication that a slice X of a source radio access node is mapped to a slice Y of a target radio access node;

wherein the information on slice remapping provides a degrade mode of the slice X, and wherein the slice Y of the target radio access node is a general-purpose slice.

16. The apparatus of claim 1, wherein the at least one memory and the computer program code are configured to, with the at least one processor, cause the apparatus further to at least perform:

transmit, based on the first message, the message to the network entity responsible for session management to control the connection of the terminal, the message comprising activity status of the packet data unit sessions associated with the slice not supported by the node.

17. The apparatus of claim 1, wherein the storing, the receiving, and the transmitting are performed by an access and mobility management function.

\* \* \* \* \*